(12) United States Patent
Kim

(10) Patent No.: US 11,134,233 B2
(45) Date of Patent: Sep. 28, 2021

(54) VEHICLE CAMERA MODULE AND CONTROL METHOD THEREOF

(71) Applicant: HYUNDAI AUTRON CO., LTD., Seoul (KR)

(72) Inventor: Kee-Beom Kim, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 16/895,184

(22) Filed: Jun. 8, 2020

(65) Prior Publication Data

US 2020/0396432 A1  Dec. 17, 2020

(30) Foreign Application Priority Data

Jun. 17, 2019 (KR) .................. 10-2019-0071487

(51) Int. Cl.
*H04N 9/64* (2006.01)
*H04N 5/225* (2006.01)
*B60R 11/04* (2006.01)

(52) U.S. Cl.
CPC ............. *H04N 9/64* (2013.01); *H04N 5/2253* (2013.01); *B60R 11/04* (2013.01)

(58) Field of Classification Search
CPC ........ H04N 9/64; H04N 5/2253; H04N 1/411; H04N 1/41; H04N 1/00204; H04N 1/2112; H04N 9/045; H04N 5/232; H04N 19/172; H04N 19/12; H04N 19/136; H04N 5/23229; H04N 19/85; H04N 5/2257; H04N 5/2254; H04N 5/917; B60R 11/04; G08G 1/167; G08G 1/161
See application file for complete search history.

(56) References Cited

U.S. PATENT DOCUMENTS 6,263,106 B1 * 7/2001 Yamagata ................. G06T 9/00
382/232
2018/0188740 A1 * 7/2018 May ........................ G01S 17/86

FOREIGN PATENT DOCUMENTS

KR  10-2012-0140032 A  12/2012
KR  10-2017-0043104 A   4/2017
KR  10-2018-0008244 A   1/2018

* cited by examiner

*Primary Examiner* — Nam D Pham

(57) ABSTRACT

A vehicle camera module may include: an image sensor; and an image transmission processor that may determine whether to compress or not compress an image captured through the image sensor according to the format of the image or a preset option, and output the compressed or non-compressed image to an external image output device. The image sensor and the image transmission processor may be implemented as an integrated module.

10 Claims, 4 Drawing Sheets

VEHICLE CAMERA MODULE AND CONTROL METHOD THEREOF

CROSS-REFERENCE TO RELATED APPLICATION

This application claims priority to and the benefit of Korean Patent Application No. 10-2019-0071487, filed on Jun. 17, 2019, the entire contents of which are hereby incorporated by reference.

FIELD

The present disclosure relates to a vehicle camera module and a control method thereof.

BACKGROUND

The statements in this section merely provide background information related to the present disclosure and may not constitute prior art.

Recently, vehicle camera modules are mounted on vehicles. The vehicle camera module includes cameras which are installed on one or more sides of the vehicle to capture images of traffic information and objects in forward and rearward areas, outputs the images through a display device (for example, AVN (Audio Video Navigation) device or cockpit device) installed in the vehicle, and monitors a blind spot condition to help a driver to safely drive the vehicle.

The number of vehicle camera modules mounted on a vehicle has gradually increased. Recently, an AVM (Around View Monitoring) system has also been applied, which includes a plurality of cameras installed around a vehicle to display an image in 360-degree directions around the vehicle. For example, the AVM system captures images around the vehicle through the plurality of cameras to monitor conditions around the vehicle, and provides a top view image (i.e. AVM image) to make a driver feel like seeing the vehicle from the sky. Thus, the driver can check obstacles around the vehicle through a screen.

Since it is highly possible that the number of autonomous vehicles will increase in the future, the number of vehicle camera modules mounted on the vehicles is highly likely to further increase. Furthermore, an image processing device (for example, AVN device or cockpit device) is required to not only output a composite image, but also rapidly receive images (videos) transmitted from a plurality of vehicle camera modules mounted on the vehicle and rapidly output a result (obstacle detection and lane detection) for a desired purpose (for example, autonomous driving) through designated image processing.

We have discovered that when the vehicle camera module processes an image through image processing by itself and transmits the processed image to the image processing device, the time required until the image is finally transferred to the image processing device may be further increased. Furthermore, when the image processing device performs image processing for a desired purpose (for example, autonomous driving), an image which has been already processed needs to be processed once again. Therefore, the processing time may be increased or the probability that an error will occur during the image processing may be increased.

Therefore, in order to prevent the above-described problem, images captured by the plurality of vehicle camera modules need to be stably and rapidly transmitted to the image processing device.

An example of this AVM system of the related art is disclosed in Korean Patent Publication No. 10-2017-0043104 published on Apr. 20, 2017, entitled "AVM System and Method for Compositing Image with Blind Spot".

SUMMARY

The present disclosure provides a vehicle camera module including, as a semiconductor module coupled to an image sensor of the vehicle camera module, an image transmission processor which can rapidly transmit an image (or video) captured through the image sensor to an external image output device such that the image output device can receive images transmitted from one or more vehicle camera modules and rapidly output a processing result (for example, obstacle detection or lane detection) for a desired purpose (for example, autonomous driving) through designated image signal processing, and a control method thereof.

In one form, a vehicle camera module may include: an image sensor configured to capture an image; and an image transmission processor configured to: determine whether to compress or not compress the captured image captured through the image sensor based on a format of the captured image or a preset option, and output a compressed or a non-compressed image of the captured image to an external image output device. The image sensor and the image transmission processor may be implemented as an integrated module.

The preset option may include at least one of non-compression, lossy compression or lossless compression based on a type or a method of image signal processing performed by the image output device so as to output a result desired by the image output device.

The image transmission processor may compress the captured image through lossless compression or lossy compression with a preset compression rate and transmit the compressed image, when compressing the image according to the preset option and transmitting the compressed image.

The image sensor may output an image in at least one of a Bayer format, an RGB format, or an YUV format.

The image transmission processor may include: a control unit configured to analyze the format of the captured image outputted from the image sensor or load previously stored image format information, and decide whether to compress or not compress the captured image according to the format of the captured image or the preset option; and a compression unit configured to compress the captured image received from the image sensor through lossless compression or lossy compression with a designated compression rate, under control of the control unit.

The image transmission processor may further include: a memory unit configured to temporarily store the captured image outputted from the image sensor or the image compressed by the compression unit; and a communication unit configured to immediately transmit the captured image temporarily stored in the memory unit or the image compressed by the compression unit to the external image output device according to a designated communication method, under control of the control unit.

In another form, a control method of a vehicle camera module may include: receiving, by an image transmission processor of the vehicle camera module, an image captured through an image sensor of the vehicle camera module; determining, by the image transmission processor, whether to compress or whether not to compress the captured image, by the image transmission processor, according to the format of the captured image or a preset option; and outputting the compressed or non-compressed image to an external image output device. The image sensor and the image transmission processor may be implemented as an integrated module.

The preset option may indicate an option associated with non-compression, lossy compression or lossless compression corresponding to the type or method of image signal processing performed by the image output device in order to output a result desired by the image output device.

When compressing the image according to the preset option, the image transmission processor may compress the image through lossless compression or lossy compression with a preset compression rate and transmit the compressed image, and transmit the compressed image.

When compressing the image according to the preset option, the image transmission processor may receive an image in any one format of a Bayer format and an RGB or YUV format from the image sensor, and transmit the compressed image.

The determining whether to compress or not the image may include: analyzing, by a control unit of the image transmission processor, the format of the captured image outputted from the image sensor or loading previously stored image format information; deciding whether to compress or not compress the captured image according to the format of the captured image or the preset option; and compressing, by a compression unit of the image transmission processor, the captured image received from the image sensor through lossless compression or lossy compression with a designated compression rate, under control of the control unit.

In some forms, the control method further includes: after deciding whether to compress or not compress the captured image, temporarily storing, by the image transmission processor, the captured image outputted from the image sensor or the image compressed by the compression unit in a memory unit; and then immediately transmitting the image stored in the memory unit or the image compressed by the compression unit to the external image output device through a previously designated communication method.

In another form, a vehicle camera module may include: an image sensor; and an image transmission processor configured to compress or not compress an image captured through the image sensor according to the format of the image or a preset option, and output the compressed or non-compressed image to an external image output device. When the format of the image outputted from the image sensor is any one of a Bayer format and an RGB or YUV format, the image transmission processor may immediately output the Bayer format image or compresses the Bayer format image through lossless compression and outputs the compressed image, and immediately output the RGB or YUV format image, or compress the RGB or YUV format image through lossless compression or lossy compression with a designated compression rate and output the compressed image.

In other form, a control method of a vehicle camera module may include: receiving, by an image transmission processor of the vehicle camera module, an image captured through an image sensor of the vehicle camera module; immediately outputting, by the image transmission processor, a Bayer format image or compressing the Bayer format image through lossless compression, when the image outputted from the image sensor is the Bayer format image; immediately outputting, by the image transmission processor, an RGB or YUV format image or compressing the RGB or YUV format image through lossless compression or lossy compression with a designated compression rate, when the image outputted from the image sensor is the RGB or YUV format image; and outputting the image, which is not compressed but immediately outputted or compressed through lossy compression or lossless compression and outputted, to an external image output device. The image sensor and the image transmission processor may be implemented as an integrated module.

In some forms of the present disclosure, the vehicle camera module may include, as a semiconductor module coupled to an image sensor of the vehicle camera module, the image transmission processor which can rapidly transmit an image (or video) captured through the image sensor to an external image output device such that the image output device can receive images transmitted from one or more vehicle camera modules and rapidly output a processing result (for example, obstacle detection or lane detection) for a desired purpose (for example, autonomous driving) through designated image signal processing.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
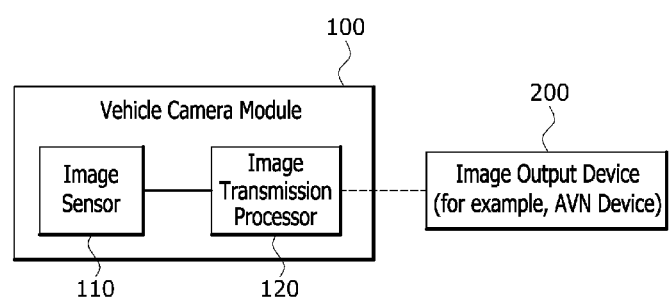
FIG. 1 is a diagram illustrating a schematic configuration of a vehicle camera module in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a vehicle camera module and a control method thereof will be described below with reference to the accompanying drawings through various exemplary forms.

It should be noted that the drawings are not to precise scale and may be exaggerated in thickness of lines or sizes of components for descriptive convenience and clarity only. Furthermore, the terms as used herein are defined by taking functions of the present disclosure into account and can be changed according to the custom or intention of users or operators. Therefore, definition of the terms should be made according to the overall disclosures set forth herein.

FIG. 1 is a diagram illustrating a schematic configuration of a vehicle camera module in one form of the present disclosure.

As illustrated in FIG. 1, the vehicle camera module 100 includes an image sensor 110 and an image transmission processor 120.

The image sensor 110 is a solid state pickup device, and includes a CCD (Charge Coupled Device) image sensor or CMOS (Complementary Metal-Oxide Semiconductor) image sensor.

The image sensor 110 may output an electrical signal (i.e. image) corresponding to the amount of light inputted through a lens for each unit pixel, and the image (i.e. picked-up image) may be outputted in a Bayer format.

The image sensor 110 may include an image processor (not illustrated) for itself, and convert the picked-up image into an RGB/YUV format through the image processor (not illustrated) and output the converted image.

Therefore, the image sensor 110 may output the Bayer format image or the image converted into the RGB/YUV format.

The image transmission processor 120 outputs the image outputted from the image sensor 110 (i.e. the Bayer format image or image converted in the RGB/YUV format) to an external image output device 200 (for example, an AVN (Audio Video Navigation) device or cockpit device) as rapidly as possible.

When rapidly outputting the image outputted from the image sensor 110 to the external image output device 200, the image transmission processor 120 may not convert the format of the image outputted from the image sensor 110 but output the image as it is, or compress the image, outputted from the image sensor 110, through a previously designated method (for example, lossless compression or lossy compression) and output the compressed image.

The image transmission processor 120 is not only to rapidly output an image, but also to output an image with no loss within the limits of possibility, such that the image output device 200 receiving the output image can stably and rapidly perform image signal processing when performing ISP (Image Signal Processing) for itself. Therefore, the basic operation of the image transmission processor 120 is to compress the picked-up image with no loss and transmit the compressed image.

The image output device 200 may receive images transmitted from one or more vehicle camera modules, respectively, and rapidly output a processing result (for example, obstacle detection, lane detection or composite image output) for a desired purpose (for example, autonomous driving or image composition) through designated image signal processing (for example, LDC (Lens Distortion Correction), composition or recognition). That is, in order for the image output device 200 to receive a plurality of images and to perform image processing, the vehicle camera modules 100 need to output or transmit picked-up images to the image output device 200 as rapidly as possible while preventing the images from being converted or lost. Preventing an image from being converted or lost may indicate that the image is not processed or additional image signal processing is not performed on an image outputted from the image sensor.

Figure 2:
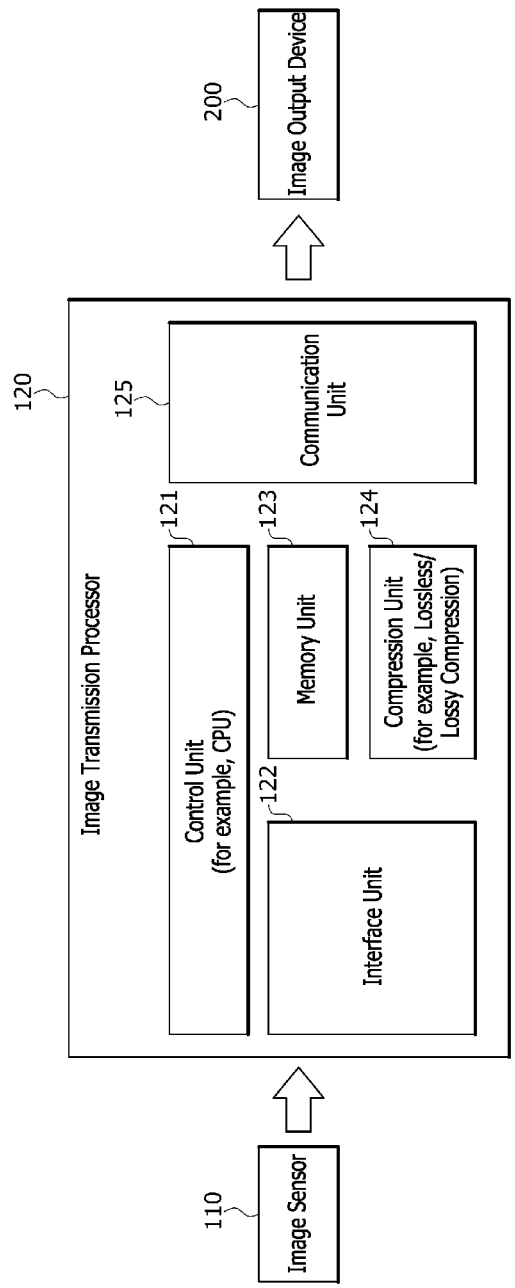
FIG. 2 is a diagram illustrating a detailed configuration of an image transmission processor in FIG. 1.

FIG. 2 is a diagram illustrating the detailed configuration of the image transmission processor 120 in FIG. 1.

As illustrated in FIG. 2, the image transmission processor 120 includes a control unit 121, an interface unit 122, a memory unit 123, a compression unit 124 and a communication unit 125. Here, the terms, such as 'unit,' 'controller,' or 'module', etc., should be understood as a unit that processes at least one function or operation and that may be embodied in a hardware manner (e.g., a processor), a software manner, or a combination of the hardware manner and the software manner.

The control unit 121 analyzes the format of an image outputted from the image sensor 110. The control unit 121 decides a compression method (for example, lossless compression or lossy compression) according to a preset option in response to the format of the image outputted from the image sensor 110.

For example, when the image outputted from the image sensor 110 has a Bayer format, the control unit 121 may control the compression unit 124 to compress the image through lossless compression (for example, Frame Buffer Compression "FBC") and output the compressed image. Furthermore, when the image outputted from the image sensor 110 has an RGB or YUV format (i.e. RGB/YUV format), the control unit 121 may control the compression unit 124 to compress the image through lossy compression (for example, H.264, HEVC or MJPEG) and output the compressed image. The lossy compression refers to a compression method with a designated loss rate. The control unit 121 may not perform compression, but output the image outputted from the image sensor 110 without converting the format of the image.

The interface unit 122 receives the image (i.e. picked-up image) outputted from the image sensor 110. For example, the interface unit 122 may be interfaced to the image sensor 110 in a serial or parallel manner.

The interface unit 122 may include a component (for example, CAN communication) for interfacing peripheral devices.

The memory unit 123 may temporally store an image outputted from the image sensor 110 (i.e. picked-up image) or temporarily store an image compressed by the compression unit 124.

The compression unit 124 compresses the image (for example, Bayer format image or RGB/YUV format image) received from the image sensor 110 according to a designated compression method (for example, lossless compression or lossy compression), and outputs the compressed image, under control of the control unit 121.

For example, the compression unit 124 may compress the image outputted from the image sensor 110 through lossless compression (for example, FBC*) or lossy compression with a designated loss rate (for example, H.264, HEVC or MJPEG), and output the compressed image, under control of the control unit 121.

The communication unit 125 transmits the image stored in the memory unit 12 or the image compressed by the compression unit 124 to an external image output device (for example, AVN device or cockpit device) 200 through a designated communication method (for example, Ethernet, LVDS, AHD, Serdes or MIPI), under control of the control unit 121.

Figure 3:
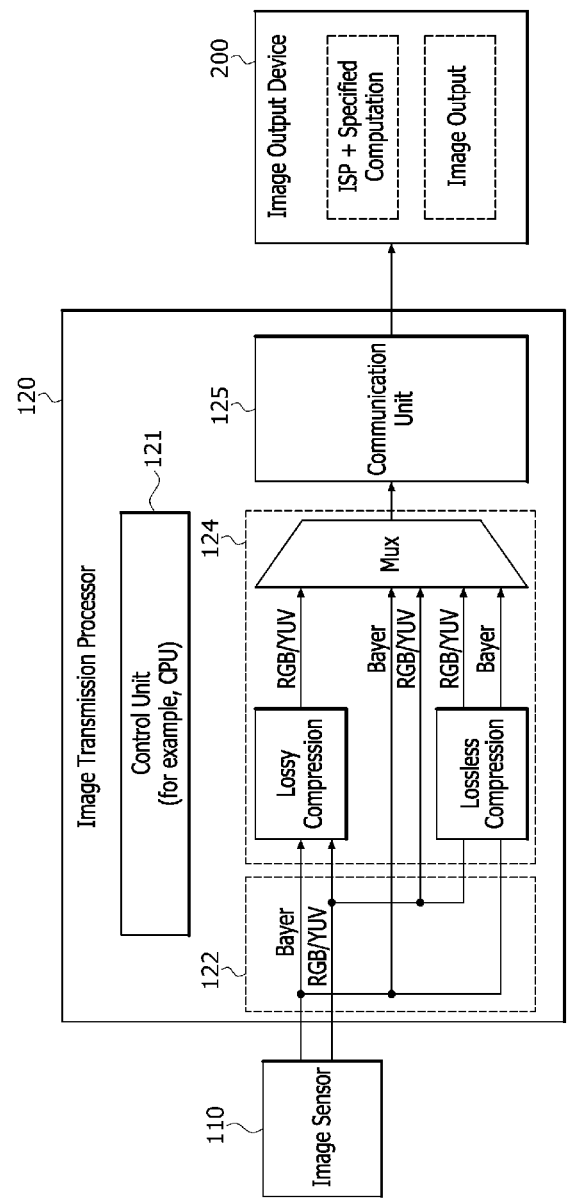
FIG. 3 is a diagram for describing an operation of the image transmission processor in FIG. 2 in more detail.

FIG. 3 is a diagram for describing an operation of the image transmission processor in FIG. 2 in more detail.

Referring to FIG. 3, the control unit 121 receives an image outputted from the image sensor 110 through the interface unit 122, and analyzes the format of the image.

At this time, the image format may be previously set at a manufacturing step of the vehicle camera module. In this case, the control unit 121 does not need to analyze the image format, but may load the previously stored image format.

For example, the image sensor 110 may output a picked-up image as a Bayer format image which has not been subjected to image signal processing, or an RGB/YUV format image processed through an image signal processor (not illustrated) which is installed in the image sensor 110 for itself.

According to the analysis result of the image format or the preset option, the control unit 121 may compress the image outputted from the image sensor 110 through lossy compression (for example, RGB/YVB lossy compression), perform no conversion on the image outputted from the image sensor 110 (for example, no image signal processing or compression), or compress the image outputted from the image sensor 110 through lossless compression (for example, RGB/YUV lossless compression or Bayer lossless compression).

In one form, the preset option indicates an option associated with non-compression, lossy compression with a preset compression rate or lossless compression, which is to be performed according to the type or method of image signal processing (for example, LDC, composition or recognition) desired for the image output device 200 to output a result based on the purpose (for example, autonomous driving or image composition).

The control unit 121 outputs or transmits the compressed or non-compressed image to the external image output device 200 through the communication unit 125. Therefore, the image output device 200 can receive images transmitted from one or more vehicle camera modules, respectively, and rapidly output a processing result (for example, obstacle detection, lane detection or composite image output) for a desired purpose (for example, autonomous driving or image composition) through designated image signal processing (for example, LDC, composition or recognition).

Figure 4:
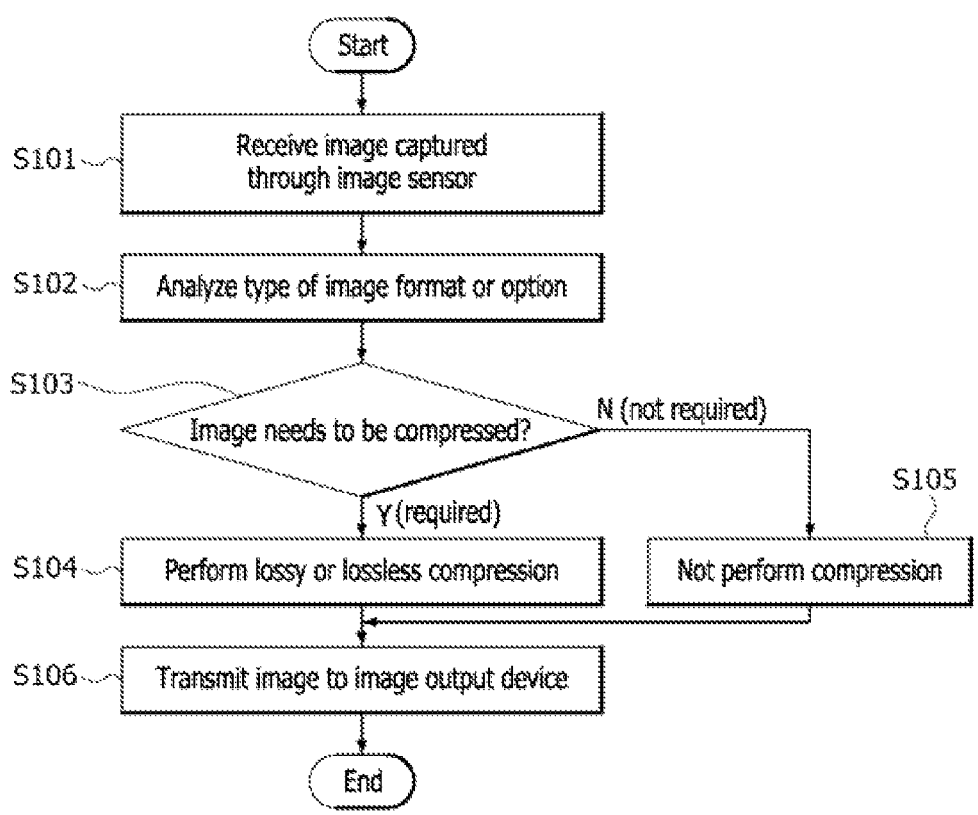
FIG. 4 is a flowchart for describing a control method of a vehicle camera module in another form of the present disclosure.

FIG. 4 is a flowchart for describing a control method of a vehicle camera module in another form of the present disclosure.

Referring to FIG. 4, the control unit 121 receives an image outputted from the image sensor 110 in step S101, and analyzes the format of the image outputted from the image sensor 110 or loads a previously stored image format.

For example, the image format includes the Bayer format or the RGB/YUV format.

The control unit 121 analyzes the type of the image format or a preset option in step S102.

The control unit 121 checks whether the image needs to be compressed, according to the result obtained by analyzing the type of the image format or the preset option, in step S103. When the check result indicates that the image needs to be compressed (Yes in step S103), the control unit 121 performs lossy/lossless compression on the image according to the type of the image format or the preset option in step S104, or does not perform compression when the image does not need to be compressed (No in step S103) in step S105.

The preset option indicates an option associated with non-compression, lossy compression with a preset compression rate or lossless compression, which is to be performed according to the type or method of image signal processing (for example, LDC, composition or recognition) desired for the image output device 200 to output a result based on the purpose (for example, autonomous driving or image composition).

The control unit 121 outputs or transmits the image compressed through lossy/lossless compression or the non-compressed image to the external image output device 200 in step S106.

Therefore, the image output device 200 can receive images transmitted from one or more vehicle camera modules, respectively, and rapidly output a processing result (for example, obstacle detection, lane detection or composite image output) for a desired purpose (for example, autonomous driving or image composition) through designated image signal processing (for example, LDC, composition or recognition).

Although the present disclosure has been disclosed with reference to the forms illustrated in the drawings, but the forms are only for illustrative purposes, and those skilled in the art will appreciate that various modifications and other equivalent forms are possible. Thus, the true technical scope of the present disclosure should be defined by the following claims. Furthermore, the forms described in this specification may be implemented with a method or process, a device, a software program, a data stream or a signal, for example. Although the forms have been discussed in a single implementation (for example, only in a method), the discussed features can be implemented in other forms (for example, device or program). The device can be implemented in proper hardware, software, firmware and the like. The method can be implemented in a device such as a processor which generally refers to a processing device including a computer, a microprocessor, an integrated circuit or a programmable logic device, for example. The processor includes communication devices such as a computer, a cell phone, a personal digital assistant (PDA) and another device, which can facilitate communication of information between an end user and the processor.

Although exemplary forms of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A vehicle camera module comprising:
an image sensor configured to capture an image; and
an image transmission processor configured to:
  determine whether to compress or not compress the captured image based on a format of the captured image or a preset option, and
  output a compressed or a non-compressed image of the captured image to an image output device,
wherein the image sensor and the image transmission processor are implemented as an integrated module, and
wherein the preset option includes at least one of non-compression, lossy compression, or lossless compression based on a type or a method of image signal processing performed by the image output device so as to output a result desired by the image output device.

2. The vehicle camera module of claim 1, wherein the image transmission processor is configured to:
compress the captured image through lossless compression or lossy compression with a preset compression rate and
transmit the compressed image.

3. The vehicle camera module of claim 1, wherein the image sensor is configured to output an image in at least one of a Bayer format, an RGB format or an YUV format.

4. The vehicle camera module of claim 1, wherein the image transmission processor comprises:
a control unit configured to:
  analyze the format of the captured image outputted from the image sensor or load previously stored image format information, and
  decide whether to compress or not compress the captured image based on the format of the captured image or the preset option; and
a compression unit configured to compress the captured image received from the image sensor through lossless compression or lossy compression with a designated compression rate, under control of the control unit.

5. The vehicle camera module of claim 4, wherein the image transmission processor further comprises:
- a memory unit configured to temporarily store the captured image outputted from the image sensor or the image compressed by the compression unit; and
- a communication unit configured to immediately transmit the captured image temporarily stored in the memory unit or the image compressed by the compression unit to the external image output device according to a designated communication method, under control of the control unit.

6. A control method of a vehicle camera module, comprising:
- receiving, by an image transmission processor of the vehicle camera module, an image captured by an image sensor of the vehicle camera module;
- determining, by the image transmission processor, whether to compress the captured image or whether not to compress the captured image, based on a format of the captured image or a preset option; and
- outputting the compressed or non-compressed image to an image output device,
- wherein the image sensor and the image transmission processor are implemented as an integrated module, and
- wherein the preset option includes at least one of non-compression, lossy compression or lossless compression based on a type or a method of image signal processing performed by the image output device so as to output a result desired by the image output device.

7. The control method of claim 6, wherein when compressing the captured image with the preset option, the image transmission processor compresses the captured image through lossless compression or lossy compression with a preset compression rate.

8. The control method of claim 6, wherein when compressing the captured image with the preset option, the image transmission processor receives the captured image in at least one of a Bayer format, an RGB format, or an YUV format from the image sensor.

9. The control method of claim 6, wherein determining whether to compress the captured image includes:
- analyzing, by a control unit of the image transmission processor, the format of the captured image outputted from the image sensor or loading previously stored image format information;
- deciding whether to compress or not compress the captured image based the format of the captured image or the preset option; and
- compressing, by a compression unit of the image transmission processor, the captured image received from the image sensor through lossless compression or lossy compression with a designated compression rate, under control of the control unit.

10. The control method of claim 9, further comprising:
- after deciding whether to compress or not compress the captured image, temporarily storing, by the image transmission processor, the captured image outputted from the image sensor or the image compressed by the compression unit in a memory unit, and
- immediately transmitting the image stored in the memory unit or the image compressed by the compression unit to the external image output device through a previously designated communication method.

* * * * *